Feb. 23, 1937.  J. REGENSTREIF ET AL  2,071,707
ELECTRIC FURNACE FOR MELTING GLASS
Filed Feb. 26, 1935  4 Sheets-Sheet 3

Inventors
Jakob Regenstreif
Ottokar Sorge
By Sommers & Young
Attys.

Patented Feb. 23, 1937

2,071,707

UNITED STATES PATENT OFFICE 2,071,707

ELECTRIC FURNACE FOR MELTING GLASS

Jakob Regenstreif, Berlin-Charlottenburg, and Ottokar Sorge, Berlin-Wilmersdorf, Germany, assignors to Patent-Treuhand-Gesellschaft fuer Elektrische Gluehlampen m. b. H., Berlin, Germany Application February 26, 1935, Serial No. 8,374
In Germany March 2, 1934

7 Claims. (Cl. 13—6)

Our invention relates to improvements in the method of and apparatus for melting glass, and more particularly in the method and apparatus in which the glass is melted by means of electric current flowing through the body of glass, the said body providing the electric resistance by means of which the electric energy is transformed into heat. In glass melting furnaces of this class such as are now in use the top part of the body of glass is ordinarily at lower temperature than the bottom part, because it is cooled by the batch supplied to the surface. Therefore most of the heating current flows through the lower layers of glass which have higher conductivity for electric current by reason of their higher temperature. The difference in the temperature of the top and bottom layers may even be such that almost the whole current flows through the lower layers, and that the upper layer is cooled more and more, so that almost no current flows through the same. Therefore in the upper part of the body of glass bridges of non-molten material are formed to which no current at all is supplied. Thus the melting of the batch is at first retarded, and finally it is completely interrupted.

The obect of the improvements is to provide a method and an apparatus in which also the upper layers of glass are effectively heated, and with this object in view our invention consists in cooling the electrodes for supplying the current to the body of glass in a different degree, the lower portion of the electrodes being cooled more energetically than the upper portions thereof, so that most of the current circulates between the upper portions of the electrodes and the upper layer of the body of glass.

Figure 5:
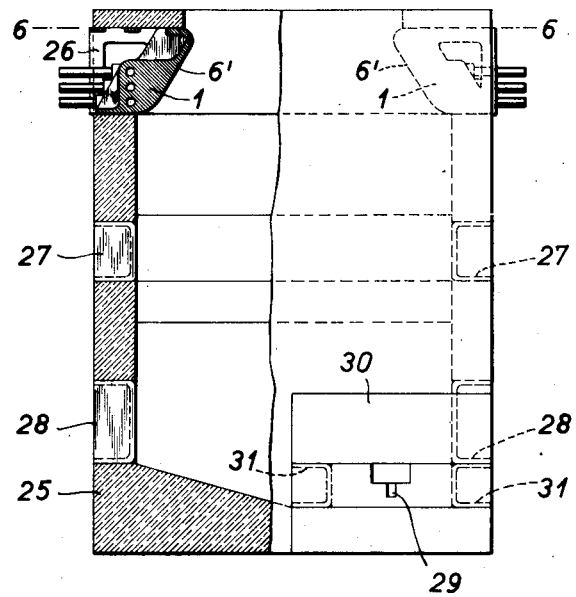
Figure 6:
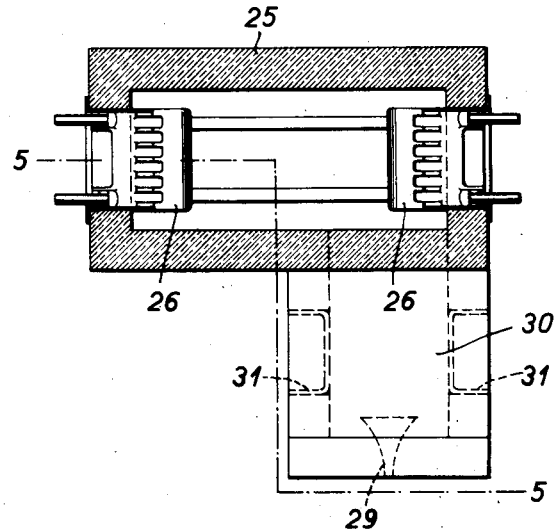
Figure 7:
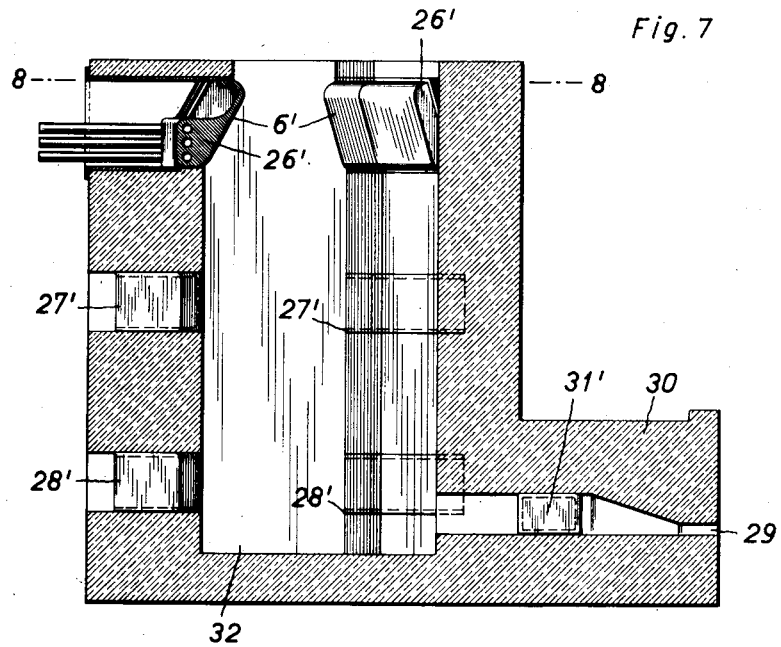
Figure 8:
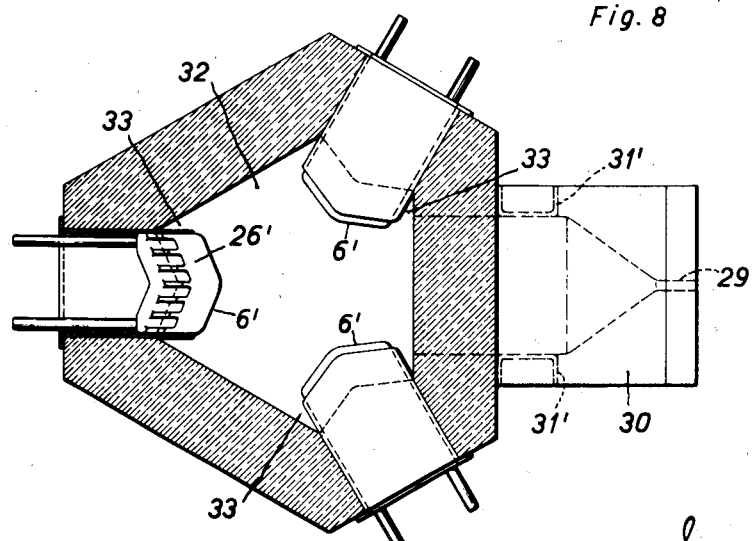
Figure 9:
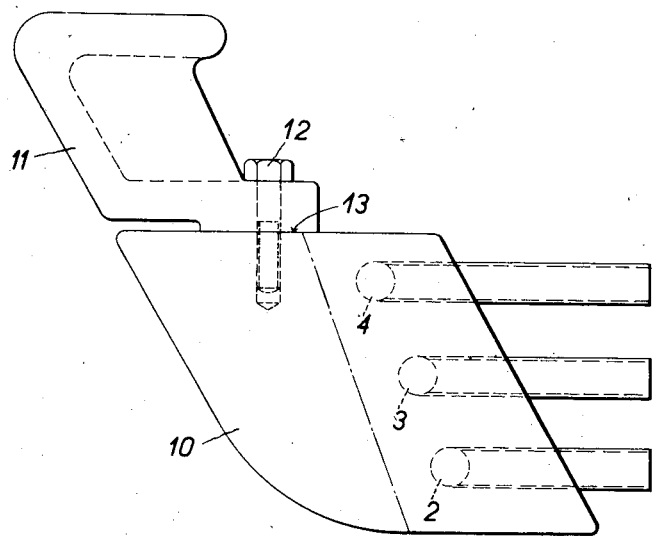
Figure 10:
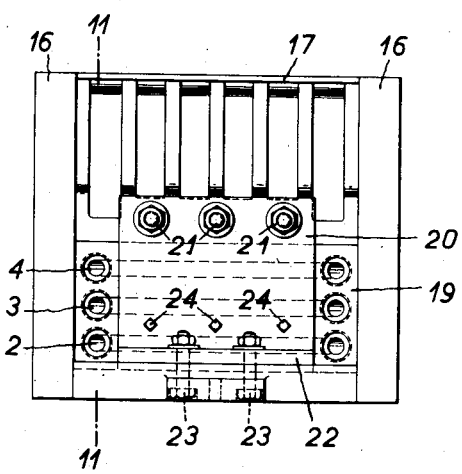
Figure 11:
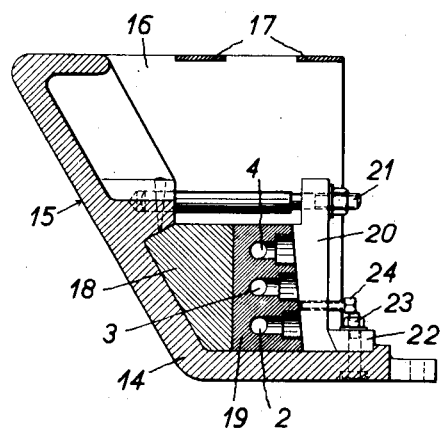

For the purpose of explaining the invention several examples embodying the same have been shown in the accompanying drawings, in which the same letters of reference have been used in all the views to indicate corresponding parts. In said drawings Fig. 1 is an elevation showing the electrode, Fig. 2 is a side elevation of the electrode shown in Fig. 1, Fig. 3 is an elevation similar to the one illustrated in Fig. 1 and showing a modification, Fig. 4 is a side elevation of Fig. 3, Fig. 5 is an elevation partly in section taken on the line 5—5 of Fig. 6 and showing a glass melting furnace, Fig. 6 is a sectional plan view taken on the line 6—6 of Fig. 5, Fig. 7 is a sectional elevation similar to the one shown in Fig. 5 and showing a modification in which the furnace is heated by means of three-phase current, Fig. 8 is a sectional plan view taken on the line 8—8 of Fig. 7, Fig. 9 is an elevation similar to the one illustrated in Fig. 2 and showing another modification of the electrode, Fig. 10 is an elevation similar to the one illustrated in Fig. 1 and showing another modification of the electrode, and Fig. 11 is a sectional elevation taken on the line 11—11 of Fig. 10.

Figure 1:
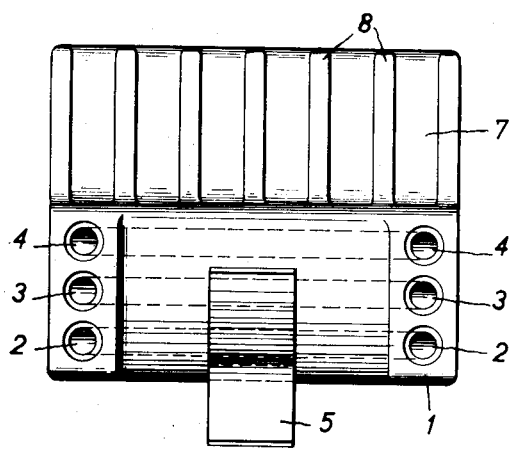
Figure 2:
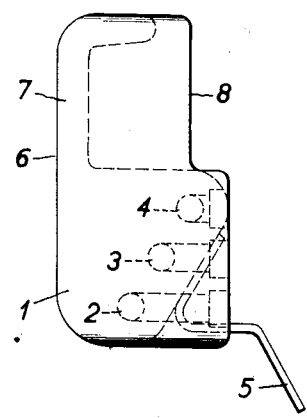

In the example shown in Figs. 1 and 2 the electrode comprises a block 1 which is formed with three cooling passages 2, 3 and 4 and which has a terminal 5 secured thereto. In the operation of the furnace having the said electrode mounted therein cooling water or another suitable cooling fluid is circulated through the said passages 2, 3 and 4. As appears from Fig. 2 the said cooling passages are disposed different distances away from the inner or active surface 6 of the electrode, the lowermost passage 2 being comparatively near the said surface 6, and the distance between the surface 6 and the passages 3 and 4 being gradually increased upwardly. The top part of the electrode takes the form of a comparatively thin wall 7, and it is formed with cooling and reinforcing ribs 8, the said ribs having moderate cooling capacity. Therefore the bottom part of the electrode is most effectively cooled, and therefore the resistance opposed to the current flowing between a pair of electrodes is comparatively high in the lower layers of the body of glass, so that the portion of the current flowing through the upper layers of the glass is increased as compared to the portion flowing through the lower layers of the glass.

Figure 3:
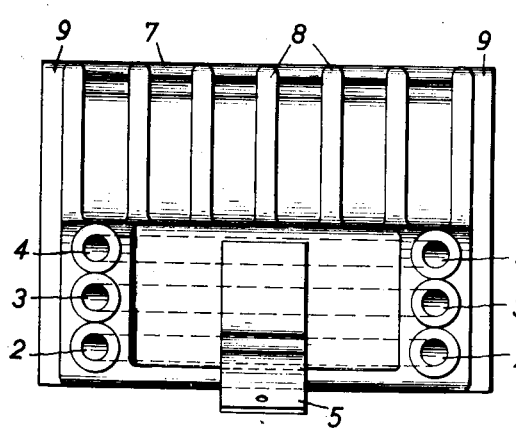
Figure 4:
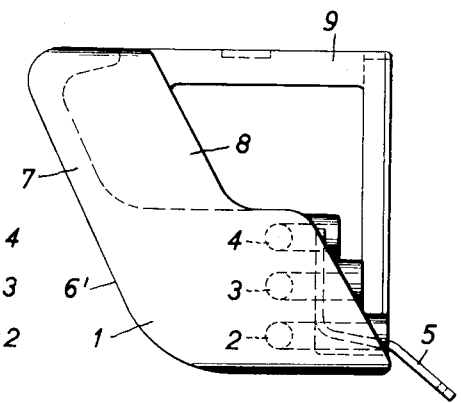

In Figs. 3 and 4 we have shown a modification of the electrode in which the inner wall 6' of the electrode is inclined inwardly and upwardly. Thereby in the furnace having pairs of electrodes embedded in opposite side walls of the tank the distance between the electrodes of each pair is smaller at the top parts of the electrodes than at the bottom parts thereof, so that the resistance opposed to the current is reduced in the top part of the body of glass and therefore the current flowing through the body of glass is greater in the upper layer than in the lower layer. Preferably the rear part of the electrode is provided with a frame 9 having a vertical rear wall and permitting the electrode to be readily mounted in the wall of the tank. The cooling passages 2, 3 and 4 are disposed vertically one above the other, and by reason of the inclined position of the front or active wall 6' of the electrode the distance between the said front wall and the cooling passages 2, 3 and 4 is gradually increased from the bottom part of the block 1 towards the top part thereof. The uppermost portion of the electrodes takes the form of a plate 7 provided with cooling ribs 8, as has been described with reference to Figs. 1 and 2.

By changing the relative distances between the inner or front walls 6 or 6' and the cooling passages 2, 3 and 4 the cooling effect may be varied within larger limits.

In both examples the block 1 may take the form of a hollow body filled with a metal of low melting temperature, such for example as lead, the said body of metal being likewise cooled by means of cooling passages.

In Figs. 5 and 6 we have shown an electric glass melting furnace having electrodes such as are shown in Figs. 3 and 4. In the wall 25 of the furnace three pairs of electrodes 26, 27 and 28 are embedded. The electrodes of the upper pair 26 are formed with upwardly and inwardly inclined walls 6', and at their bottom parts they consist of blocks 1 formed with cooling passages 2, 3 and 4, as has been described with reference to Figs. 3 and 4. The electrodes of the pairs 27 and 28 take the form of boxes. At the bottom part of the furnace a chamber 30 is provided which is formed with a flow spout 29, and which is adapted to be heated by means of electrodes 31 taking the form of boxes. Preferably independent circuits are provided for the pairs of electrodes 26, 27, 28 and 31.

The furnace shown in Figs. 5 and 6 is heated by means of two-phase alternating current. In Figs. 7 and 8 we have shown a modification in which the furnace is heated by means of three-phase current. The melting chamber 32 is provided with three superposed sets of electrodes 26', 27' and 28', each set comprising three electrodes arranged at equal angles relatively to one another. The electrodes 26' of the upper set are provided with inwardly and upwardly inclined front faces 6' and their bottom parts consist of blocks which are formed with cooling passages.

As appears from Fig. 8, the front faces 6' are composed of two plane surfaces arranged at an obtuse angle. Thereby the side portions of the electrodes which are located near the wall of the melting chamber 32 are protected against excessive current density. Further the electrodes project inwardly from the wall of the melting chamber, so that pockets 33 are formed at either side of each electrode. Thereby the brick work near the electrode is kept at comparatively low temperature, and it is protected from injury.

The electrodes 27' and 28' of the lower sets take the form of boxes, and they are cooled only by the outer air.

The delivery chamber 30 containing the flow spout 29 is heated by means of a pair of electrodes 31' located in one of the phases of the current, and the said electrodes take the form of boxes which are cooled only by the outer air.

In the operation of the furnace provided with electrodes such as are described herein there is a strong fall of temperature in the layers of glass located between the electrodes, the temperature being comparatively high in the upper layers. The bottom part of the active electrode surface 6 or 6' is most effectively cooled, and therefore the adjacent layer of glass and its conductivity are reduced so that an excessive current between the corresponding portions of the electrodes is prevented. According to the different distances between the active electrode surface and the cooling passages the temperature of the glass is increased upwardly, thus causing an increased current intensity. Therefore most of the current flows between the top parts of the electrodes which are cooled in a less degree than the lower portions of the electrodes. The difference of temperature in the portions of the glass adjacent to the upper and lower portions of the electrodes is several hundreds of degrees Centigrade so that also the specific resistance of the lower layer of glass may be ten times that of the upper layer. The cooler layer of glass located between the lower portions of the electrode may be very thin, and its thickness depends on the amount of heat supplied to the glass by the electric current and removed therefrom through the walls of the tank.

The electrodes may consist of highly refractory metal or metal alloys, as is known in the art. Electrodes of the construction shown herein may be provided in shaft furnaces having several pairs of electrodes located one above the other, as is shown in Figs. 5 and 6, and in comparatively flat tank furnaces having several pairs of electrodes disposed in portions of the tank located one behind the other.

When the difference of the temperature between the lower and upper parts of the electrodes is very large as may be the case for example in highly heated furnaces and in furnaces having comparatively large electrodes, it may happen that cracks are formed in the electrodes whereby the said electrodes are subject to rapid destruction.

For this reason we prefer to manufacture the electrodes in sections, the size and shape of the said sections being such that the tension caused by the difference of temperature does not exceed the elastic limit on the material. Figs. 9, 10 and 11 show two modifications in which the electrodes are made in sections.

In the construction shown in Fig. 9 the electrode is composed of two superposed sections 10 and 11. The lower section 10 takes the form of a solid block, and it is cooled by means of cooling passages 2, 3 and 4. To the block 10 the upper section 11 is secured by means of one or more screws 12, and the contacting surfaces 13 are ground to a high finish so that they closely fit on each other. The upper section 11 of the electrode is provided only with cooling ribs, as has been described with reference to Figs. 1 and 2.

In the modification shown in Figs. 10 and 11 the electrode takes the form of an angular body 14 the front part 15 of which is the effective electrode surface, and which is enclosed at its side in a frame composed of two side walls 16 and a pair of connecting members 17. In the obtuse angle provided at the bottom of the body 14 a filling piece 18 is located, and at the rear of the said filling piece there is a block 19 which is provided with cooling passages 2, 3, 4. The said filling piece 18 and the block 19 are fixed in position by means of a plate 20 pressed on the block 19 by means of screws 21 and a wedge shaped member 22 acting on the bottom part of the plate 20 and fixed to the bottom of the body 14 by means of screws 23. In addition screws 24 may be provided in the plate 20 which are screwed inwardly after the plate 20 has been fixed in position by means of the screws 21 and 23, for pressing the cooling block 19, the piece 18 and the body 14 of the electrode into closed contact with one another. Also in this case the contacting surfaces of the sections are made with a high finish by grinding so that they closely fit one upon the other so as to insure effective cooling action.

The construction shown in Figs. 10 and 11 is preferable as compared to that shown in Fig. 9 insofar as the active wall 15 of the electrode consists of an integral body though the body of the electrode is made in sections.

We claim:

1. In an electric glass melting furnace, an electrode comprising a conductive body having means for supplying a cooling fluid thereto, said means being constructed so that the distance between the active surface of the electrode making contact with the body of glass and the portions of the supply of fluid is increased from the bottom part towards the top part of the electrode.

2. In an electric glass melting furnace, an electrode comprising a conductive body formed at its top part with cooling ribs, and means for supplying a cooling fluid to the bottom part of the said body, the distance between the active surface of the electrode and the portions of the means for supplying the cooling fluid being increased from the bottom of the electrode towards the top thereof.

3. In an electric glass melting furnace, electrodes comprising bodies having their front walls contacting with the glass and being located in the furnace walls below but close to the upper surface of the glass and having their front walls inclined inwardly and upwardly, and means, comprising cooling passages located in the bottom parts of said electrodes and disposed one above the other with the distances between the front wall and said passages increasing from the bottom towards the top, for cooling the bottom parts of said electrode bodies to a greater extent than the top parts thereof.

4. In an electric glass melting furnace, an electrode comprising a body having a bottom part and a front part inclined from said bottom part inwardly and upwardly, a block on said bottom part formed with cooling passages, a piece intermediate said front and rear parts, a plate at the rear of said rear part, and means for pressing said plate on said rear part.

5. A furnace as claimed in claim 4, in which said pressing means comprise a wedge engaging the bottom part of said plate and fixed to said bottom part, and a screw fixed to said front part and engaging the top part of said plate.

6. An electrode for electric glass melting furnaces in which the glass flux serves as the heating resistance, means for cooling the electrode comprising passages formed one above another in the lower part of the electrode, the lower passages extending closer to the active surface of the electrode than the upper passages.

7. An electrode for electric glass melting furnaces in which the glass flux serves as the heating resistance, means for cooling the electrode comprising passages formed one above another in the lower part of the electrode, the lower passages extending closer to the active surface of the electrode than the upper passages, the upper portion of the electrode being provided with cooling fins.

JAKOB REGENSTREIF.
OTTOKAR SORGE.